United States Patent [19]

Jonkers

[11] Patent Number: 4,779,718
[45] Date of Patent: Oct. 25, 1988

[54] BELT CONVEYOR WITH ACTIVE PART OF THE BELT SUPPORTED BY A GAS LAYER

[76] Inventor: Cornelius O. Jonkers, Zwaluwenweg 26, 1261 GJ Blaricum, Netherlands

[21] Appl. No.: 769,712

[22] Filed: Aug. 27, 1985

[30] Foreign Application Priority Data

Aug. 29, 1984 [NL] Netherlands ............ 8402628

[51] Int. Cl.$^4$ .................................... B65G 15/60
[52] U.S. Cl. ........................... 198/811; 198/810
[58] Field of Search ....................... 198/811, 810

[56] References Cited

U.S. PATENT DOCUMENTS

| | | | |
|---|---|---|---|
| 3,627,111 | 12/1971 | Hillinger | 198/811 |
| 3,712,457 | 1/1973 | Pelzer | 198/810 |
| 3,734,271 | 5/1973 | Dolgolenko et al. | 198/811 |
| 3,889,802 | 6/1975 | Jonkers | 198/811 |
| 3,923,151 | 12/1975 | Weber | 198/810 |

FOREIGN PATENT DOCUMENTS

| | | | |
|---|---|---|---|
| 2640129 | 11/1977 | Fed. Rep. of Germany | 198/810 |
| 2732504 | 2/1979 | Fed. Rep. of Germany | 198/811 |
| 57-151521 | 9/1982 | Japan | 198/810 |
| 785148 | 12/1980 | U.S.S.R. | 198/810 |

*Primary Examiner*—Robert J. Spar
*Assistant Examiner*—Lyle Kimms

[57] ABSTRACT

For belt conveyors in which the loaded part of the belt is supported by a gas layer in a trough, the energy needed to drive the belt is lower if the belt is more fully out of contact with the trough. But much energy is needed to compress the gas carrying the belt. The invention proposes to provide for measuring the power for these two purposes and to alter the gas flow into the trough so that the total power requirement is at a minimum. The latter may be performed in steps and as soon as a step appears to result in an increase of power required, this step may be undone. Drives of the belt (1) and of a compressor (6) by electric motors (5, 8) make measurement of electric power supplied thereto preferable. A control member (14) receives signals of power measurements and issues signals to change the power for drive of the compressor. Instead of separate measurements added by the control member (14) the latter may be fed with a measurement of the total power supplied for both purposes. For long conveyor belts there may be more than one compressor and more than one electric motor for moving the belt, in which case, together with the control of the compressors, one or more of such drive motors may be switched on or off to keep the operating motors at high efficiency.

15 Claims, 1 Drawing Sheet

BELT CONVEYOR WITH ACTIVE PART OF THE BELT SUPPORTED BY A GAS LAYER

BACKGROUND OF THE INVENTION

The invention relates to a belt conveyor with active part of the belt supported by a trough wall through the medium of a gas layer. Such a belt conveyor is known from U.S. Pat. No. 5,889,802.

The belt conveyor is one of the most widely used means of conveyance for bulk goods. This is partly due to its relatively low energy consumption. Other conveyors, such as e.g. vibrating or screw conveyors, use 10 to 100 times the energy per ton km. For plants with great conveyance distances and high conveyance capacities in particular, low energy consumption per ton km of conveyed bulk goods is extremely important from the point of view of costs. In the designing of such a plant, every effort will therefore be made to achieve the lowest energy consumption.

In the hitherto most commonly used design of belt conveyors, the belt is supported by supporting rollers. The energy consumption per ton km of conveyed material is determined here by the resistance forces which the belt encounters during conveyance. In a new plant, all rollers will run smoothly and the belt resistance—which is the sum of all resistance forces—will be low. However, as time passes, wear and soiling of the bearings will cause an increasing number of rollers to drag more, which increases the belt resistance. An inadmissibly great belt resistance can be avoided only by replacing dragging rollers in good time by new or repaired rollers. The costs involved here do, however, constitute a considerable item in the overall running costs of the belt, and an optimum will have to be found between not too frequent maintenance work, on the one hand, and not too high energy consumption through dragging rollers, on the other.

Another design of belt conveyor is the above-mentioned air belt conveyor. Here, the belt is supported over its entire length by a trough. By blowing air under the belt via openings in the trough, by means of a compressor plant, e.g. a centrifugal compressor, a thin film of air is produced between the belt and the trough, as a result of which the belt resistance is much lower than it is in the absence of the air film.

Unlike the belt conveyor with supporting rollers, in the case of the air belt conveyor the energy consumption is not solely determined by the energy required for driving the belt, but also by the energy needed to drive the compressor device (for the sake of brevity, called a compressor below). The total energy consumption is therefore the sum of the energies for the driving of the belt and for the driving of the compressor. In the design of an air belt conveyor, the air flow capacity of the compressor will also have to be determined. A large capacity, thus a large output of air flow, means a great thickness of air film and thus low belt resistance. Although the energy required for driving of the belt is low then, a large amount of energy is needed for driving the compressor, and the total energy consumption will be high as a result, i.e. high in relation to the energy consumption of a belt conveyor with supporting rollers. Likewise, a compressor with small capacity will require little energy for driving it, but owing to the low air film thickness, the belt resistance will be high, and this will make the total energy consumption high. The job of the designer of the conveyor is to select a compressor with the right capacity, so that the total energy consumption is low.

One difficulty here is that the conditions in which the conveyor operates are not constant. The optimum capacity of the air pump as regards total energy consumption is determined by a number of factors. One important factor is e.g. the loading of the belt. In a conveyor which generally operates with a fully loaded belt, the optimum compressor will be quite different from that of a conveyor generally operating with a half-loaded belt. Another factor which has an effect is whether there is continuous uniform loading of the belt, or loading which varies widely or is often interrupted, so that parts of the belt are loaded while others are not. The quality of the trough also plays an important role. If the trough is e.g. badly manufactured and/or mounted, so that the surface of the trough has many uneven zones which cause direct local contact between the belt and trough, thereby causing great belt resistance, a thicker film of air, and thus a compressor of larger capacity, will be needed than in the case of a smooth trough with few uneven zones, to decrease this resistance.

Through use, the uneven zones in the badly manufactured trough will, however, in the course of time gradually wear off by the belt, continuously rubbing thereon, so that the conveyor becomes increasingly smoother and the belt resistance decreases. The value of the optimum compressor capacity will also be reduced as a result in the course of time.

The fact that in the case of the air belt conveyor energy has to be fed in at two points therefore, on the one hand, gives the designer possibilities—through the right selection of the ratio of the two energy supplies—of achieving the optimum situation with a minimum total energy consumption. On the other hand, making the right choice is very difficult and, owing to the changing influence factors, the actual situation as regards energy consumption will generally deviate from the optimum situation.

SUMMARY OF THE INVENTION

The object of the invention is now to produce an improvement here. It has been found that it is possible to arrange the drive unit of the air belt conveyor, i.e. including the drive of the compressor, in such a way that in all circumstances there is a virtually optimum ratio between the energy supplies for the belt drive and the compressor drive, so that the total energy consumption is always minimal or virtually minimal. To this end, a belt conveyor of the type referred to in the preamble is, according to the invention, characterized in that the gas flow for maintaining the gas layer is obtained by means of one or more gas compressors or the like with adjustable output, so that the energy required for the drive of the compressor(s) changes in the same direction as the gas output, and that it has means for measuring the power for the drive of gas compressor(s) and the power for the driving of the belt, and a control system with means to determine alterations of these powers or of the sum thereof, and on the basis of such alterations altering the gas flow in such a way that the total power requirements for maintaining the gas flow and for driving the belt are kept to a minimum.

This means that the compressor(s) has (have) an adjustable gas output, in such a way that for a lower value of the output the energy needed for driving the compressor(s) is also lower. This can, for example, be achieved by altering the speed of the compressor(s), but depending on the type of the compressor, other possibilities are also conceivable. For example, if centrifugal compressors are used, the gas flow can also be altered by means of throttling. With compressors of the displacement type, such as so-called Roots blowers, output control by which the driving power required changes in the same direction as the gas output, will not, however, be possible by means of throttling.

The drive unit of the conveyor also contains a control member with which the gas output of the compressor(s) can be adjusted. This can be, for example, a process computer with the appropriate apparatus to permit adjustment of the gas output. The unit also contains one or more measuring elements with which either the total power supplied for driving the belt and the compressor(s), or each of the two power supplies separately, can be measured. The measured value(s) of these powers is (are) transmitted in the form of measurement signals to the control member. This is possible in a simple manner, for example if both the compressor(s) and the belt are driven by electric motors, which is often the case in practice. The values of the power supplied can then be measured with wattmeters, and the measurement signals corresponding to these power values can be transmitted to the control member. In the control member the two signals can be combined to one signal corresponding to the total power supplied. It is also possible with a single wattmeter to measure the total electrical power supplied and to transmit the corresponding measurement signal to the control member. The control member adjusts the gas output of the compressor(s) in such a way that the total power supplied in the given working conditions of the conveyor is the minimum. If a change now occurs in these working conditions, thereby altering the total power supplied, the control member will operate and adjust the gas output of the compressor(s) in such a way that in the new conditions the total power supplied is again the minimum. The change in the working conditions can be for example, a change in the supply of material to the belt, which produces a change in the load on the belt, so that the belt resistance also changes, and thus also the power needed to drive it. The measurement signal from it to the control member will thus also change, and the control member will react to this by adjusting the gas output. This again produces a change in the belt resistance, resulting in a new value for the signal corresponding to the total power supplied.

If this power has become smaller in the new situation, the control member will adjust the gas output further, and this will go on until a situation is reached where the alteration in the gas output causes an increase in the total power supplied. The minimum has then just been passed, and the control member will set the gas output just at the previous value reached while no increase in the power supplied has occurred and the total power supplied thus was minimal. If after the first adjustment of the gas output the total power has not decreased, but has increased, this setting has been an incorrect one, and the control member will react thereto by adjusting the gas output in the opposite direction and continuing thus until the minimum in the total power supplied has been reached. Of course, the adjustment of the gas output is always subject to limits, and a situation can arise where there is no minimum total power supplied within these limits. The control member will then adjust the gas output to the limit value with the lowest total power supplied.

It is also possible to have the control member react to the signal corresponding to the total power supplied. This is used if, for example, a wattmeter is used to measure the total electrical power supplied and the signal from this is the only one available.

The control member must be able to perform a number of different functions, such as taking up input signals, combining these signals, retaining the values of the signals, drawing conclusions from them, and converting these conclusions into output signals for setting the air output. Given the number and nature of these functions, and with the current state of the art, a control member based on digital logic will be preferable to an analogue-type control member.

The control member can be programmed relatively simply and specially for the purpose, but it can also be a more complex control member, such as a process computer or processor with which several functions can be performed. This can be an advantage if e.g. the conveyors concerned are very long, with the belt being driven by more than one driving drum, and where there is often more than one drive motor per drum. For the complete belt drive, a number of drive motors are therefore used. As regards the energy consumption, the efficiency of the motors is, of course, also important. In general, this efficiency is low if a motor has a low load on it, and the efficiency will increase with increasing motor load. So if the belt is only lightly loaded, the motor load will be low, and the motors will thus be working with low efficiency. In such a case it is advantageous in terms of energy to apply the invention in such a way that together therewith one or more motors are switched off, so that the motors not switched off will work under a higher load and thus with greater efficiency. Special automatically operating equipment can be used for this switching on and off, but it is also easily possible to control the switching on and off of the motors in optimum fashion using a process computer. In this way one obtains a belt conveyor which is driven in all conditions with the minimum of energy.

BRIEF DESCRIPTION OF THE DRAWINGS

The invention will now be explained in greater detail with reference to the attached drawings, in which.

DESCRIPTION OF PREFERRED EMBODIMENTS

In this drawing the electricity feed cables are shown schematically by ordinary solid lines, and the cables for the measurement signals (signal lines) are indicated by dotted lines with arrows which show the direction of the signal.

Figure 1:
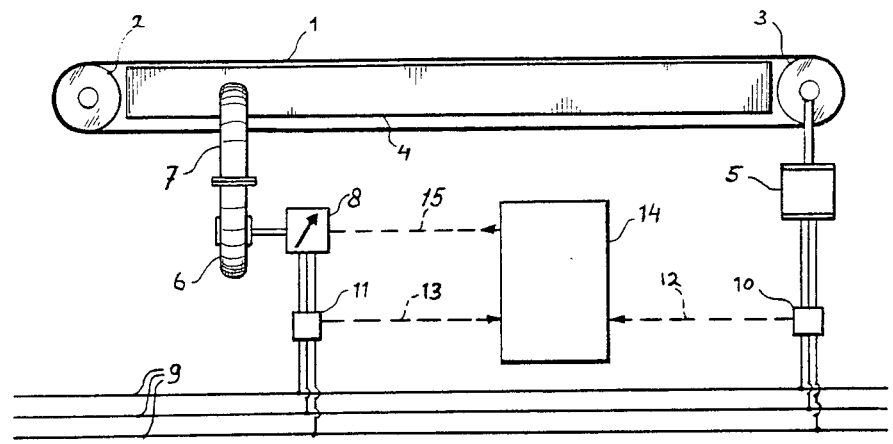
FIG. 1 is a schematic representation of a conveyor system in a first embodiment.

An example according to a first embodiment is shown schematically in FIG. 1. The belt 1 extends under some tension between the reversing drums 2 and 3. The top run is supported by the air case 4, whose top side is trough-shaped. The reversing drum 3 is driven by a drive mechanism 5, comprising an electric motor with a gearbox (for the sake of clarity drawn here as turned over 90°). An air compressor 6 feeds compressed air through the pipe 7 to the air case 4. Shown here is a centrifugal compressor, but in principle other compressors such as Roots blowers or piston compressors can also be used. The compressor is driven by an adjustable drive mechanism 8. This can, for example, comprise a three-phase motor or a synchronous motor in conjunction with an adjustable frequency converter. The motor drives the compressor directly or by means of, e.g. a gear transmission and the speed (r.p.m.) is controlled by means of frequency control. A different embodiment of the adjustable drive mechanism 8 comprises, for example, an asynchronous three-phase motor in conjunction with an adjustable mechanical or hydraulic transmission mechanism. The energy feed to the electric motors in the two drive mechanisms 5 and 8 is by means of the electrical cables 9. In this example, there is three-phase current, so that three power cables are shown. The electrical power supplied to each of the two drive mechanisms 5 and 8 is measured by means of wattmeters 10 and 11 respectively. From these meter signals through signal lines 12 and 13, which indicate the electrical power to the drive mechanisms 5 and 8, go to the control member 14, which comprises, e.g. a microcomputer with appropriate input and output means. Since in this example the power of each of the two drives is measured separately, the two measured values are totalled in the control member 14 to the value for the total power supplied. The control member will now react if changes occur in one or both of the signals 12 and or 13 fed in. This can take place in such a way that the control member reacts only if the change exceeds a certain threshold value, so that the control member therefore does not react to small changes.

If now, for example, the material feed to the conveyor in operation falls off, so that the belt therefore is loaded less, the belt resistance will also be reduced, and thus also the power supplied to the drive 5. The resulting change in the signal 12 puts the control member 14 into action. From the control member a control signal 15 is now sent to the adjustable drive mechanism 8, for example in such a way that the speed of the compressor reduces to a certain extent, and corresponding to this the air flow from the compressor to the air case 4. The drive 8 of the compressor now requires less power, and this change in power is passed on to the control member by the wattmeter 11 in the form of a change in the measurement signal 13. Through the reduction in the air flow, the air film between the belt and the trough becomes thinner, which increases the belt resistance. As a result, the measurement signal 12 will indicate a higher value. In the control member the new values of the two powers supplied are added together and this new total power is compared with that before the change occurred. If the new value is lower, the control member will repeat the procedure and transmit another control signal 15 to the drive mechanism 8, as a result of which the speed of the compressor is reduced further.

This process is repeated until the control member no longer finds a fall, but a rise in the total power, following which the control member sets the compressor speed at the previous value at which it was found that it was just short of a rise in the total power, i.e. at the value corresponding to the minimum total power.

It is also possible that, after the first lowering of the compressor speed by the control member, the total power has not fallen, but has risen. In that case the control member will bring about a second change in the compressor speed in the reverse direction, i.e. an increase instead of a reduction. If this leads to a reduction of the total power, the control member will proceed with a further increase in the compressor speed until the total power no longer decreases, but increases, following which the value corresponding to the minimum total power is set.

Figure 2:
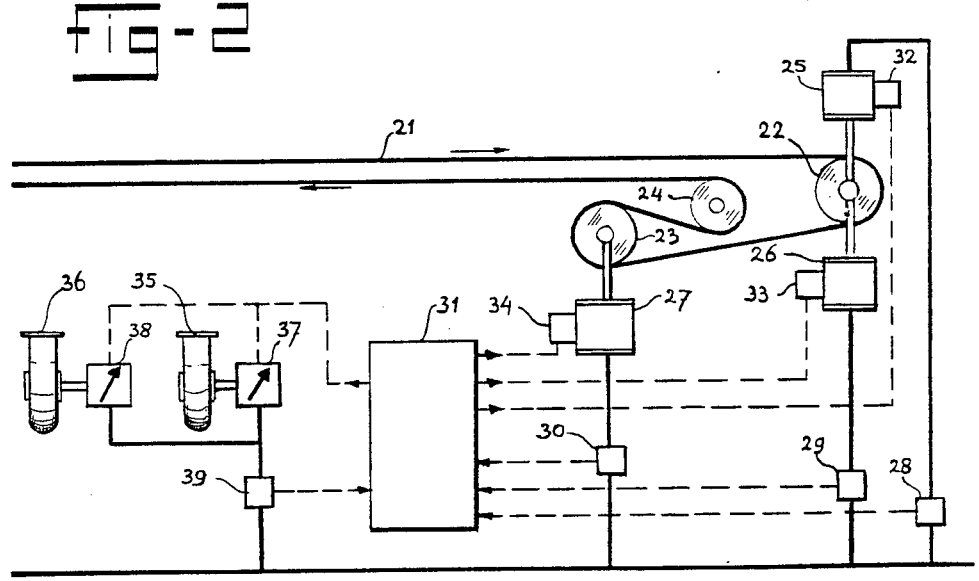
FIG. 2 is a schematic representation of such a system in a second embodiment.

Another example is shown schematically in FIG. 2. This is an air belt conveyor several kilometres long, where the belt is driven by two drums at the discharge end. Owing to the great length of the conveyor, there are also several air compressors which are uniformly distributed over the length, e.g. every 1500 metres a compressor. For the sake of simplicity, only the discharge end of the belt of the conveyor with reversing and driving drums is shown, and only two compressors are illustrated.

The belt 21 is driven by means of the driving drums 22 and 23, while the drum 24 acts as a reversing and tension drum. Since the belt tension over drum 22 is greater than over drum 23, drum 22 can transmit a greater moment, and it is therefore driven by two electric motors 25 and 26, while drum 23 is driven by one motor 27. The electrical power of each motor is measured by the wattmeters 28, 29 and 30, and the measurement signals from these meters are fed to the control member 31. The motors 25, 26 and 27 are provided with switching-on and switching-off equipment which can be operated by means of control signals from the control member 31. The compressors 35 and 36 are driven by the adjustable drive mechanisms 37 and 38. The total electrical power to the electric motors in these mechanisms is measured by the wattmeter 39, and the corresponding signal is taken to the control member 31. This member reacts in the same way as described in the first example to changes in the signals from the wattmeters 28, 29, 30 and 39. The control member 31 also reacts to the value of the measurement signals from the meters 28, 29 and 30, in such a way that, if the measured electrical powers fall below a certain value, one or more motors for driving the belt will be shut off. With decreasing load, motor 25 is, for example, switched off first, and then motor 27. In the same way, with increasing load, these motors will be switched on again successively.

The design of the control members 14, 31 gives the expert no problems in the light of its functions clearly described above. The choice of the size of the various steps of change in power supplied to the air compressor(s), the limit values at which in the example of an embodiment in FIG. 2 one or more motors will be switched off, the time intervals for the successive measurements, and the minimum size of each power change to which there is a reaction etc. can easily be selected, partly depending on the desired precision of the control system.

I claim:

1. In a belt conveyor having a belt supported on a trough wall by a gas layer, the improvement which comprises: an air compressor connected to the belt for supplying the gas layer supporting the belt, the air compressor having a motor means for delivering air to the belt and compressor motor control means for changing the power consumption of the compressor motor means in relation to the amount of air delivered to the belt to increase the power consumed by the compressor motor means when the amount of air delivered is increased and to decrease the amount of power consumed by the compressor motor means when the amount of air delivered to the belt is decreased; air compressor power consumption measuring means connected to said air compressor motor means for measuring the amount of power consumed by said air compressor;

a belt driving means connected to the belt for moving the belt, the belt driving means including a motor means and being adapted to change its power consumption in relation to the power needed to drive said belt;

a belt drive power consumption measuring means for measuring the power consumed by said belt driving motor means; and a system control means connected to said air compressor power consumption measuring means, to said belt drive power consumption measuring means and to said compressor motor control means for totaling the power consumed by said air compressor motor means and said belt drive motor means and controlling said air compressor motor control means to control the air compressor motor operation to change the amount of gas delivered by said air compressor to the belt in response to a change in one of said power consumption to maintain the total power consumed by said compressor motor means and said belt driving motor means at or near a minimum value.

2. The belt conveyor of claim 1 wherein said system control means controls said compressor control means to change in amount of gas delivered to the belt in a direction which is opposite to the direction of change in the total amount of power consumed.

3. The belt conveyor of claim 1 wherein said system control means controls said compressor control means to increase the amount of gas delivered to the belt in response to a decrease in the total amount of power consumed.

4. The belt conveyor of claim 1 wherein said system control means controls said compressor control means to decrease the amount of gas delivered to the belt in response to an increase in the total amount of power consumed.

5. The conveyor of claim 1 wherein said system control means controls said compressor control means to change in amount of gas delivered to the belt in a direction which is the same as the direction of change in the total amount of power consumed.

6. The conveyor of claim 5 wherein said system control means controls said compressor control to increase the amount of gas delivered to the belt for an increase in the total amount of power consumed.

7. The conveyor of claim 5 wherein said system control means controls said compressor control means to decrease the amount of gas delivered to the belt for a decrease in the total amount of power consumed.

8. The conveyor of claim 1 wherein said belt driving means includes a plurality of electric motors.

9. The conveyor of claim 1 wherein said system control means always controls said compressor control means to initially change the power consumed by said air compressor in a predetermined direction in response to any change in the power consumed by said belt drive means motor means.

10. The conveyor of claim 1 wherein said system control means always controls said compressor control means to initially change the power consumed by said air compressor in the same direction as a change in the power consumed by said belt drive means motor means.

11. The conveyor of claim 1 wherein said system control means executes system control in steps so that if the air compressor motor control means controls the air compressor motor operation to change the amount of gas delivered by the air compressor to the belt, the air compressor control means is controlled so the power for generating the gas flow is changed to a new value and, on measurement of a smaller total power consumed after such change, the air compressor control means is controlled so that air compressor power consumption is changed further in steps in the same direction until said total power consumed no longer decreases following which said air compressor control means is controlled so such total power consumed is maintained constant, whereby gas flow is generated at a level at which the lowest total power consumed occurred.

12. In a belt conveyor having a belt supported on a trough wall by a gas layer, the improvement which comprises:

an air compressor connected to the belt for supplying the gas layer supporting the belt, the air compressor having a motor means for delivering air to the belt and compressor motor control means for changing the power consumption of the compressor motor means in relation to the amount of air delivered to the belt to increase the power consumed by the compressor motor means when the amount of air delivered is increased and to decrease the amount of power consumed by the compressor motor means when the amount of air delivered to the belt is decreased;

a belt driving means connected to the belt for moving the belt, the belt driving means including a motor means and being adapted to change its power consumption in relation to the power needed to drive said belt; and a power consumption measuring means for measuring the power consumed by said air compressor motor means and by said belt driving means, a system control means connected to said power consumption measuring means and controlling said air compressor motor control means to control the air compressor motor operation to change the amount of gas delivered by said air compressor to the belt in response to a change in the total amount of power consumed by said belt drive motor means and said compressor motor means to maintain the total power consumed by said compressor motor means and said belt driving means motor means at or near a minimum value.

13. The conveyor of claim 12 wherein said system control means always controls said compressor control means to initially change the power consumed by said air compressor in a predetermined direction in response to any change in the total power consumed by said belt drive means motor means and said compressor motor means.

14. The conveyor of claim 12 wherein said system control means always controls said compressor control means to initially change the power consumed by said air compressor in the same direction as a change in the total power consumed in response to any change in the total power consumed by said belt drive means motor means and said compressor motor means.

15. The conveyor of claim 12 wherein said system control means executes system control in steps so that if the air compressor motor control means controls the air compressor motor operation to change the amount of gas delivered by the air compressor to the belt, the air compressor control means is controlled so the power for generating the gas flow is changed to a new value and, on measurement of a smaller total power consumed after such change, the air compressor control means is controlled so that air compressor power consumption is changed further in steps in the same direction until said total power consumed no longer decreases following which said air compressor control means is controlled so such total power consumed is maintained constant, whereby gas flow is generated at a level at which the lowest total power consumed occurred.

* * * * *